United States Patent [19]

Palazzetti et al.

[11] Patent Number: 5,234,049
[45] Date of Patent: Aug. 10, 1993

[54] SENSOR UNIT FOR VEHICLE AIR-CONDITIONING SYSTEMS

[75] Inventors: Mario Palazzetti; Gianfranco Salotti, both of Avigliana; Fabio Mingrino, Turin, all of Italy

[73] Assignee: Fiat Auto S.p.A., Turin, Italy

[21] Appl. No.: 920,107

[22] Filed: Jul. 24, 1992

[30] Foreign Application Priority Data

Jul. 31, 1991 [IT] Italy .............. TO91 A000615

[51] Int. Cl.$^5$ ............................ G01K 17/00
[52] U.S. Cl. .................... 165/11.1; 62/126; 236/91 C; 374/29
[58] Field of Search ............ 236/91 C, 91 R, 68 C; 374/29; 364/578, 149; 62/126; 165/11.1

[56] References Cited

U.S. PATENT DOCUMENTS

| | | | |
|---|---|---|---|
| 2,146,604 | 2/1939 | Taylor | 236/91 R |
| 2,168,178 | 8/1939 | Thompson | 236/91 R |
| 2,176,002 | 10/1939 | Jenning | 236/91 C |

FOREIGN PATENT DOCUMENTS

0060463 9/1982 World Int. Prop. O. .
0274077 7/1988 World Int. Prop. O. .

*Primary Examiner*—William E. Wayner
*Attorney, Agent, or Firm*—Fish & Richardson

[57] ABSTRACT

The sensor unit consists of a scale model of the vehicle mounted on the roof of the vehicle itself. The sensor unit measures the amount of energy exchange necessary to obtain the desired air-conditioning in its interior environment and generates a signal, which is of a predictive nature, indicating the amount of energy exchange necessary to obtain the corresponding air-conditioning in the passenger compartment of the vehicle.

13 Claims, 1 Drawing Sheet

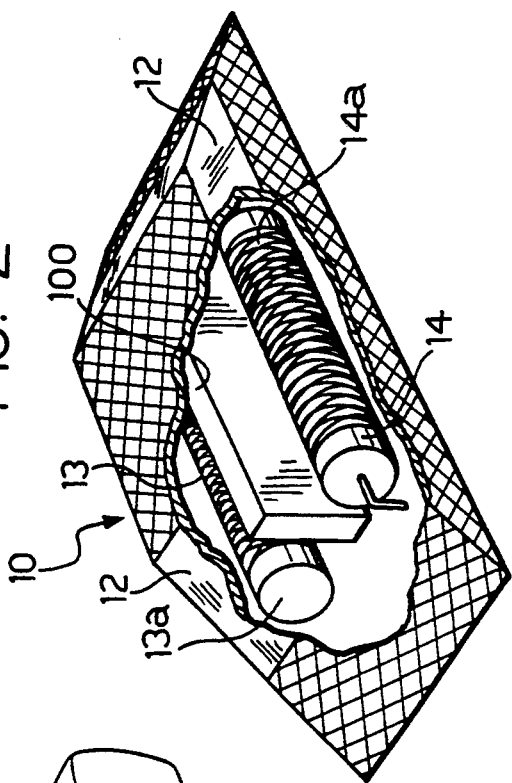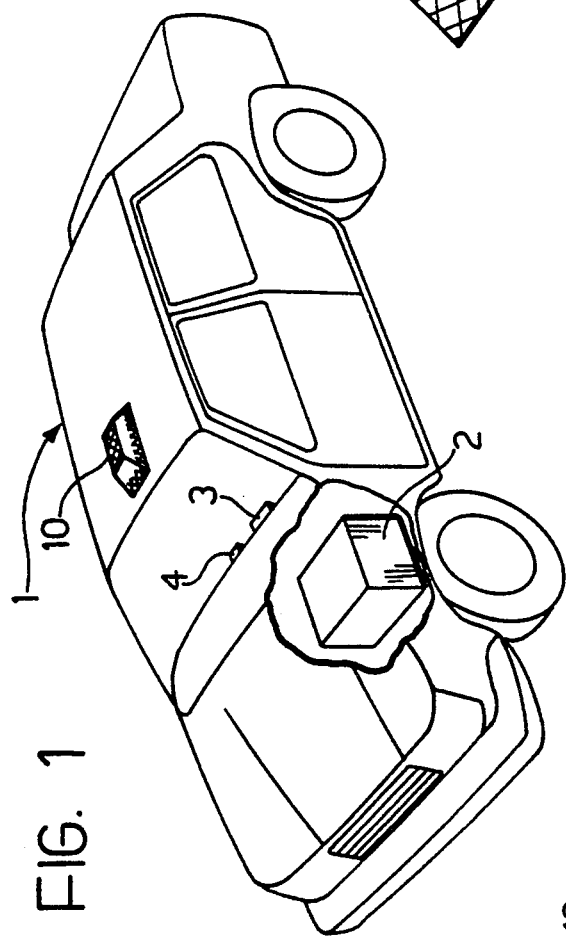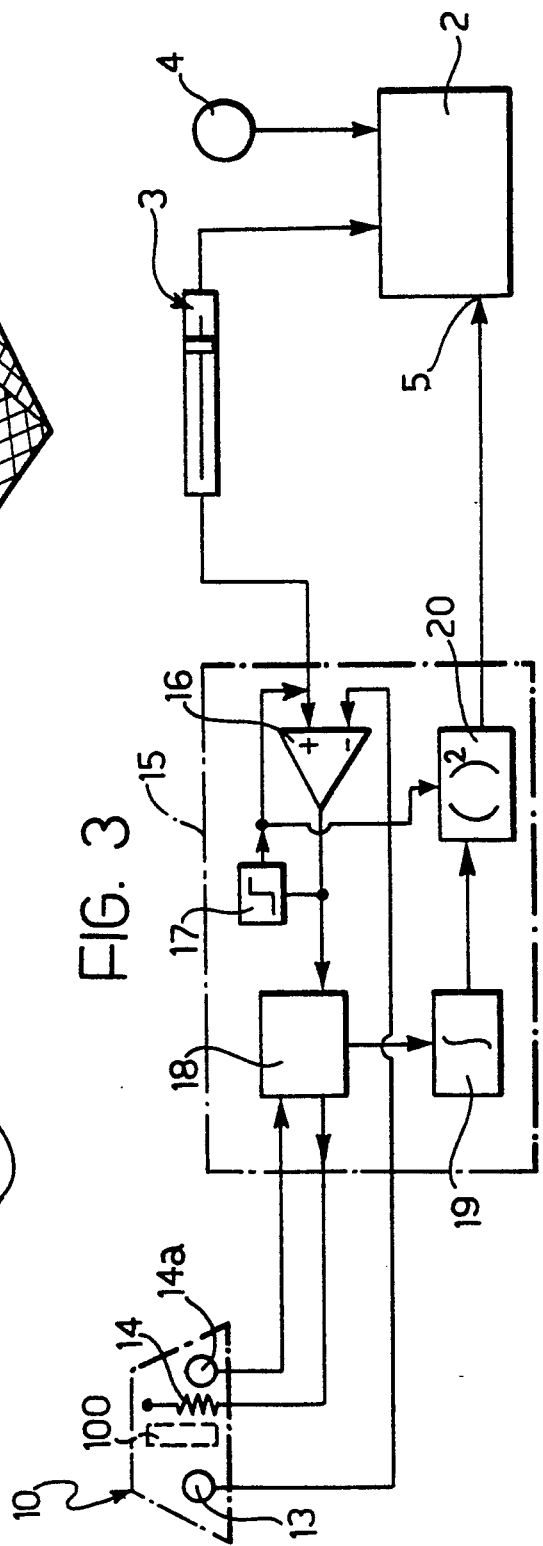

SENSOR UNIT FOR VEHICLE AIR-CONDITIONING SYSTEMS

This invention refers in general to air-conditioning systems for vehicles, for example motor cars.

The term "air-conditioning systems" is intended to indicate in general all systems and devices whose main function is to render the ambient conditions in the vehicle's passenger compartment as favourable and pleasant as possible for the persons occupying it. According to well-known principles, this result may be achieved by adjusting various environmental parameters, such as firstly temperature and humidity, and secondly the general heating or cooling of the passenger compartment.

In addition to the most simple air-conditioning systems, whose operation is adjusted simply by commands issued by the driver or passengers with no actual retroactive monitoring action, there are systems with at least one thermostatic (or similar) sensor located in the passenger compartment whose output signal is used to drive the air-conditioning system with the aim of achieving the desired ambient condition identified by the driver or passengers by adjusting a relevant control.

However, the speed and precision with which the air conditioning system responds to the requirements expressed generally depend on the external climatic conditions Obviously, if a desired temperature of 20° is set in the passenger compartment, this condition is reached more rapidly and more precisely if the external temperature is similar to this level, rather than if the external ambient temperature is much higher or lower than the desired level.

For this reason, some particularly sophisticated air-conditioning systems employ several sensors located outside the motor vehicle whose function is to identify the ambient conditions outside the vehicle and accordingly to regulate the intensity of intervention of the active devices (for example for heating or cooling) of the air conditioning system. All this is not only in order to ensure that the latter's action is more rapid, but also to avoid this action being too sudden and causing, for example, an undesired rapid lowering of temperature in the passenger compartment when the temperature difference to be made up is only small.

It should be remembered that the air-conditioning action basically involves a transfer of energy to and from the passenger compartment, in accordance with the situations that are present from time to time.

In general, the extensive application of such sophisticated air conditioning systems meets with two basic difficulties.

Firstly, the adoption of sensors for measuring the external environmental conditions on the whole constitutes a costly solution, both because of the intrinsic cost of the individual sensors which naturally have to be precise and reliable, and because of the need to connect the sensors to processing units located inside the motor vehicle for controlling the air-conditioning system.

Secondly, in order for the action of the adjustment on the air-conditioning system to be truly effective, it is necessary to be able to process the signals produced by these sensors in accordance with fairly refined algorithms. This requirement is then accompanied by the decision, virtually imperative with regard to electronic systems intended to be installed in motor vehicles, to use simple and light systems of small dimensions, resistant to a generally unfavourable environment like that of a motor vehicle, which in practice means having very simple electronic processing devices with generally limited capacities, also in terms of amount of available memory. If these requirements are to be met, then the adjustment model must be simplified, which naturally leads to results that are not ideal.

The aim of this invention is to overcome the above-mentioned difficulties by providing a sensor unit which simply and precisely incorporates the functions normally performed by systems that comprise several sensors for measuring the external environment, with the associated processing circuits.

According to this invention, this aim is achieved thanks to a sensor unit for air conditioning systems which has the characteristics specifically referred to in the claims below.

Very briefly, this invention is based on the recognition of the fact that, by having a "model environment" to be air-conditioned outside the motor vehicle (for example on the roof), and proceeding from time to time with its air conditioning in accordance with the specific requirements (which may usually be achieved very quickly, in view of the small dimensions of the model environment), it is possible to obtain a precise and reliable indication (which, because of the very speed with which the model environment is air-conditioned, is per se of a predictive nature) of the amount of energy the air-condition system has to transfer to or from the vehicle's passenger compartment in order to obtain the desired effect. In one possible embodiment, the model environment to be air-conditioned may be defined by a reduced scale model of the motor vehicle, which can evidently be simplified so as to assume the typical characteristics of a mock-up.

In one particular aspect, this invention is also based on the recognition of the fact that, with reference to such a sensor unit, provided the starting temperature is the same and temperature changes are reasonably small, the amount of energy that has to be taken from the model environment to obtain a reduction in the temperature of this environment is basically the same as the amount of energy that has to be brought into the environment in order to obtain a temperature change of the same extent but in the other direction, in other words heating. Hence, in the model environment to be air-conditioned, it is sufficient to fit simplified air-conditioning devices which can effect an air-conditioning action involving an increase in temperature.

The invention will be described below, purely as an example which is not limiting, with reference to the attached drawings, in which:

FIG. 1 illustrates schematically the structure of a motor vehicle equipped with an air-conditioning system to which a sensor unit according to the invention is fitted, FIG. 2 illustrates in greater detail the features of a sensor unit according to the invention, FIG. 3 illustrates, in the form of a block diagram, the general electrical connection layout of a sensor unit according to the invention within the context of its air-conditioning system.

In FIG. 1, a motor vehicle, such as a motor car, generally indicated 1, is fitted with an air-conditioning system 2 intended to effect the air-conditioning (in the generally accepted meaning of this term specified in the introduction to this description) of the motor vehicle's passenger compartment.

To this end, the air-conditioning system 2 comprises heaters, cooling devices, de-humidifiers, etc. all per se of a well-known nature. These devices therefore do not need to be specifically described herein, since such a description is not relevant to an understanding of the invention.

Similarly, it is a known fact (see FIG. 3) that the system 2 may be fitted with a control system comprising at least one control unit 3, for example, consisting of a linear sliding selector (so-called "slider") on which the driver or passengers may select the temperature level they wish to maintain in the passenger compartment. The system 2 (at least in the embodiment described herein) is also associated with a sensor 4 in the passenger compartment which measures the conditions in the compartment, particularly in order to check whether the conditions selected by the motorists have been achieved.

Naturally (this too according to well-known criteria) there may be several control components 3 for identifying various parameters (for example temperature, humidity, etc.).

Similarly the sensor 4 need not necessarily be a sensor of a purely thermometric nature. For example, it may consist of sensor for comfort or environmental ease such as that described in the Italian patent 1.183.980.

It is also known that the system 2 (in particular the so-called control unit or processing unit—usually electronic - which controls its operation) may have an input 5 that receives a signal which in general identifies the ambient conditions outside the vehicle (more precisely, outside the vehicle's passenger compartment) so as to adjust accordingly the intensity of the air-conditioning system's action in order to achieve the desired final conditions quickly and in a stable manner.

In general, in the solutions according to known technology to which reference has been made in the introduction to this description, the signal reaching the input 5 is obtained from measurement signals generated by several sensors located outside the motor vehicle's passenger compartment by means of processing based on a rather complex mathematical model.

Furthermore, it should be noted that, at least in some systems in which the action of measuring the external environmental conditions is particularly refined, it is also possible to do without the internal environmental sensor 4. All this is in accordance with a solution which can also be applied in the case where the signal reaching the input 5 is generated by a sensor according to the invention.

In this respect, it is reiterated that the structure, characteristics and general operating criteria of components 2, 3, 4 and 5 mentioned above must be considered to be of well known technology and so do not require a particular description herein.

The sensor according to the invention, generally indicated 10, comprises a casing usually intended to be mounted outside the motor vehicle's passenger compartment.

For reasons which will become clearer from the following description, it is naturally preferred for the sensor according to the invention to be placed in a position where it may reproduce as accurately as possible the position of the motor vehicle 1 in relation to the surrounding environment (especially with regard to exposure to the sun, etc.). For this reason, it may be considered preferable to place the sensor unit 10 on the motor vehicle's roof, for example near the middle point of the top edge of the windscreen (the so-called "aerial point").

As may be better appreciated from the detailed view of FIG. 2, the casing of the sensor unit 10 in practice consists of a mock-up or model of the body of the motor vehicle 1. In the embodiment to which reference has been made by way of a non-limiting example, the motor car 1 is a normal three-compartment saloon car and the casing of the sensor unit 10 schematically reproduces the characteristics of the motor vehicle's bodywork. For example, in a successfully tested sensor, the casing consists of a prism of trapezoidal section about 17 mm wide, whose vertical trapezoidal faces have a larger base of about 46 mm, a smaller base of about 15 mm and a height of about 11 mm. It is basically a schematic model, to approximately 1/100 scale, of the motor car 1. In any case, the model could also be larger, for example to a scale of about 1/50. To render the modelling of the motor vehicle's passenger compartment more accurate, the casing 10 may contain one or more transparent areas 12 for reproducing the behaviour of the window panes of the motor vehicle 1, especially for the purpose of simulating the phenomenon of insolation.

Naturally, the sensor unit 10 could be of a radically different shape, for example, with a generally ovoid casing.

The casing of the sensor unit 10 is preferably made from a transparent plastics material (for example Plexiglas, PVC, etc.) in which the areas other than the areas 12, intended to reproduce the behaviour of the glazed openings of the motor vehicle's passenger compartment, have been shaded.

Furthermore, the cavity inside the casing of the sensor unit 10 can either be empty or filled with a thermal insulating material whose strength of action depends on the specific application requirements.

The casing of the sensor unit 10 generally contains an environmental sensor 13 (for example a sensor which is basically similar to the sensor 4, such as a thermometric sensor) and an air conditioning device consisting, for example, of a resistor 14 (possibly associated with a cooling device, for example a Peltier effect cell—not illustrated) whose function is to produce heating (or cooling) of the space inside the sensor's casing. In the currently preferred form of embodiment of the invention, the sensor 13 consists of a thermistor formed from a copper wire wound round a core 13a.

The heating element 14 instead consists of a resistor which is separated from the sensor 13 by a baffle 100. This baffle, consisting of a heat-insulating material (for example Vetronite or a similar material), usually extends along the vertical median plane of the sensor so that the sensor 13 and the resistor 14, which also extend along the length of the sensor unit, are on opposite sides. In this way the sensor 13 is prevented from being heated directly by the resistor 14, which would falsify the detection results. Furthermore, a further copper wire 14a may be wound round the resistor 14 to constitute a further thermistor (and hence another thermal sensor) which may be used, for example, to detect a failure in operation of the resistor 14.

According to criteria which, per se, are known and do not need to be specifically referred to herein (in this respect useful reference may be made, for example, to the description of Italian patent 1.183.980), the sensor 13 and the heating element 14 may also in fact be combined in a single heat-sensitive resistive component. For simplicity of explanation, however, specific reference has been made in this description to the presence of two separate components.

A control and processing circuit, indicated 15, is interposed between the sensor unit 10 and the air-conditioning system 2 (and the components fitted to it).

The circuit 15 is basically intended to carry out two different functions.

Firstly, it must be sensitive to the control adjustment action performed by the motorist; in practice, as schematically simplified herein, it must be sensitive to the air-conditioning adjustment selected by the motorist. With reference to the most common case, it is assumed herein that the circuit 15 is capable of detecting the pre-selected temperature level set on the slider 3.

Secondly, the circuit 15 is intended to process a signal which identifies the characteristics of the air-conditioning action performed inside the sensor unit 10, with a view to using this signal as a control signal to be supplied to the input 5 of the system 2 for regulating the action of the air-conditioning system of the motor vehicle.

In practice, the output signal coming from the slider 3, in which the motorist selects the desired temperature, is sent to one of the inputs (for example, the non-inverting input) of a comparator module 16 whose other input receives the output signal of the environmental sensor 13 present in the sensor unit. The deviation signal thus obtained is sent firstly to a +/− sign detection module 17 (whose function will be explained below) and secondly to a module 18 which controls the action of the resistor 14, whose function is to air-condition the model, environment inside the sensor unit 10, thus simulating the air-conditioning action to be performed in the passenger compartment of the motor vehicle.

The signal generated by the module 18, in other words, the signal driving the resistor 14, is transferred to another detection module 19, usually with integrating or counting characteristics, which supplies to its output a signal which, after being processed in a module 20 (for example a square-forming module), is transferred to the input 5 of the air-conditioning system 2.

Moreover, it is evident that the processing functions carried out by the modules indicated 16, 17, 18, 19 and 20 may be performed either at the level of the circuit itself, for example, by discrete electronic components operating on analogue signals, or, in accordance with a solution to be considered preferable, by the processing of digitized signals by a processing module (for example, a microprocessor) which may be incorporated in the control module of the air-conditioning system 2.

The detection module 19 usually consists of a counter which is activated by the module 18 together with the resistor 14, so that it can supply to its output (towards module 20) a signal identifying the activation time (also in successive intervals) required by the resistor 14 to carry out the action of controlling the conditions in the sensor unit's model environment.

Let it be supposed, for example, that the motor vehicle 1 (and hence its passenger compartment and, consequently, the sensor unit 10 with the model environment therein) are at a temperature of 15° with the vehicle 1 parked.

The motorist enters the vehicle and, considering that this temperature is too low, activates the air-conditioning system by setting a temperature of 20° on the slider 3.

At the output of the comparator module 16 there will therefore be a signal indicating the deviation existing between h temperature set on the slider 3 (20°) and the temperature measured by the sensor 13 (15°). This signal, indicating a deviation of 5°, determines the activation of the module 18 which in turn supplies the resistor 14. The latter heats up and transfers heat to the environment inside the sensor unit 10 ("model environment"). Naturally, if the resistor 14 is damaged and does not carry out the required heating action, the sensor 14a will send a corresponding signal to the module 18, which in turn will issue a warning signal to the system 5, also indicating to the motorist (for example, via a warning lamp on the instrument panel) that the sensor unit 10 is not working.

When the resistor 14 is working correctly, the above-mentioned situation (model environment heated by the resistor 14) continues, usually for a very short period of time in view of the small volume of the environment inside the sensor unit 10, until the temperature of the environment of the sensor unit 10 has reached the desired 20°, in other words, when the deviation between the two signals present at the input of the comparator module 16 is cancelled. At this point the module 19 which, as mentioned, is a counter or a timer, will detect a signal identifying the time period during which the resistor 14 had to be activated in order to achieve the desired air-conditioning effect.

The duration of the intervention by the air-conditioning is clearly influenced by the external ambient conditions. If, after collecting the vehicle, the driver goes to a very hot area (for example, moving from a shaded position to a position exposed to the sun), the air-conditioning action will be much quicker, since the environment inside the sensor unit will also be heated by external sunlight. Conversely, if the vehicle moves to a cooler area (for example, moving from a closed place to the outside with no sunlight and a rather low temperature), the air-conditioning action will generally be longer.

In any case, the time necessary for achieving the air-conditioning of the environment in the sensor unit 10 is shorter than the period necessary for achieving the air-conditioning of the environment in the sensor unit 10 is shorter than the period necessary for achieving the air-conditioning of the passenger compartment of the motor vehicle. The latter has a much larger volume (for example, by a factor of $10^6$, if the sensor unit 10 constitutes a 1/100 model of the motor car) than that of the environment inside the sensor unit, and has glazed openings with considerably larger surface areas (generally in accordance with a square law with respect to the relationship existing between the dimensions of the vehicle 1 and the dimensions of the sensor unit 10).

In any case, the signal supplied by the detection module 19 constitutes an optimum indication of the extent of the required air-conditioning action, in general, of the amount of energy that has to be transferred to the motor vehicle's passenger compartment in order to achieve the desired air-condition.

All this is in accordance with generally predictive criteria since, as has been observed, the air-conditioning of the environment inside the sensor unit 10 is performed in a shorter time than that necessary for achieving the air-conditioning of the motor vehicle's passenger compartment.

The signal produced by the module 19 thus constitutes a good parameter for driving the operation of the air-conditioning system. This signal will naturally be all the more valid the more precisely the sensor unit 10 reproduces the characteristics of the vehicle and especially of its passenger compartment. Thus, apart from the geometry of the areas in question (especially of the transparent surfaces through which sunlight penetrates), it is important to bear in mind other parameters which play a significant role in the overall temperature behaviour of the passenger compartment (for example), the nature of the seat upholstery and door trim, whether there is any insulation inside the doors and sides of the motor car, etc.).

All these parameters can easily be defined once and for all, perhaps on an experimental basis, when the geometric characteristics of the sensor unit 10 ar e defined.

Naturally, it is also possible to take account of such factors in the embodiment of the processing law herein expressed symbolically by model 20.

As mentioned, in a particularly simple embodiment, this module may, in general, be a square-generating module for taking account of the fact that the motor vehicle's passenger compartment usually exchanges heat with the outside mainly by means of irradiation through the glazed surfaces, whose size (and hence the intensity of the irradiation) varies in accordance with the square law in relation to the dimensional proportions between the motor vehicle 1 and it smock-up represented by the sensor unit 10.

The example of behaviour described above is also reproduced virtually identically, and in a dual manner, in the case where, for example, the motorist sets the slider 3 to a lower temperature than that measured by the sensor 13 (and so the sensor 4), if the cooling component (for example, the Peltier cell) associated with the resistor 14 is enabled, instead of the resistor 14.

Returning to the above example, it is assumed that the motorist has set the slider 3 to a desired temperature of 20° while the ambient temperature—present simultaneously in both the passenger compartment and the sensor unit 10—is 25°.

In this case, at the output of the comparator module 16 there will be a deviation signal indicating a temperature difference of 5°, but this time with a negative sign. This signal is transferred to the +/− sign detection module 17. The latter, when it perceives that the temperature change desired by the motorist (expressed by the selection on the slider 3) is of a negative sign, forces onto the non-inverting input of the comparator circuit 16 a temperature reference signal corresponding to a temperature change of the desired amplitude, but in the opposite direction.

In practice, if, as mentioned, the sensor 13 indicates a temperature of 25° and a temperature of 20° has been selected on the slider 3, the +/− sign circuit 17 forces onto the non-inverting input of the comparator circuit 16 a level of signal corresponding to a desired temperature of 30°.

The process of conditioning the environment inside the sensor unit 10 is thus conducted in accordance with the same methods as those described above and so—within a very short time—at the output of the detection module 19 there is a signal indicating the general amount of energy which had to be applied to the environment inside the sensor unit 10 to obtain the transfer of energy corresponding to the desired climate condition (but in the opposite direction). This signal is then transferred to the processing module 20, which also receives from the +/− sign module 17 indication of the fact that the signal received from the detection module 19 must be interpreted, with regard to the transfer to the air-conditioning system 2, as indicative of an amount of energy that must be removed from the motor vehicle's passenger compartment in order to obtain the desired condition.

As mentioned, the fact that the amount of energy that has to be transferred to or form the environment inside the sensor unit 10 is in practice the same, irrespective of the direction of the transfer (heating or cooling), constitutes an approximation model generally valid for small temperature variations. At all events, the non-exact equivalence of the required amount of energy depending on the direction of the air-conditioning process may be taken into account (for example on an experimental basis) in the processing function performed in the module 20.

Naturally, the principle of the invention remaining the same, the details of construction and forms of embodiment may be varied widely from those described and illustrated, without thereby departing from the scope of the present invention.

We claim:

1. A sensor unit for vehicle air-conditioning systems, the said systems comprising devices for controlling the conditions in the vehicle's passenger compartment which act with an intensity which is selectively variable in accordance with at least one relevant control signal indicating the ambient conditions outside the vehicle, including:
   - a casing defining an environment to be air-conditioned, constituting a model environment of the passenger compartment of the vehicle,
   - a sensor means located in the said model environment for generating at least one sensor signal indicative of the environmental conditions in the said model environment,
   - energy exchange means located in the said model environment and adapted to be activated selectively in dependence on said at least one sensor signal to effect the air-conditioning of the model environment by means of an energy exchange of the appropriate amount with the model environment, and
   - detection means for measuring the amount of the energy exchange effected by the energy exchange means to control the conditions of the model environment and for generating a model signal indicating the amount of energy exchange, the model signal being usable to generate said at least one relevant control signal.

2. A sensor unit in accordance with claim 1, wherein said casing constitutes substantially a reduced scale model of the vehicle.

3. A sensor unit in accordance with claim 2, wherein said casing constitutes substantially a model of the vehicle to a scale of about 1/50 to 1/100.

4. A sensor unit in accordance with claim 1, wherein said casing is mounted in a position generally facing the outside of the vehicle.

5. A sensor unit in accordance with claim 4, mounted on the roof of the vehicle.

6. A sensor unit in accordance with claim 1, wherein said energy exchange means also act as senor devices located in the model environment.

7. A sensor unit in accordance with claim 1, wherein said sensor means are essentially thermometric sensors.

8. A sensor unit in accordance with claim 1, wherein said energy exchange means are heating means.

9. A sensor unit in accordance with claim 1, wherein heat separation means are arranged between the sensor means and the energy exchange means to prevent the direct heat exchange between the energy means and the sensor means.

10. A sensor unit in accordance with claim 1, wherein said detection means comprise a module for establishing whether the air-conditioning of the model environment must be effected by means of an energy exchange involving an addition or a removal with respect to the model environment, and also means for driving the energy exchange means which, if it is detected that the required energy exchange involves a removal of energy from the model environment, can nevertheless activate the energy exchange devices to make an addition of energy to the model environment in order to effect an air-conditioning action of the same extend but in the direction opposite that of the requested addition, the signal detected by the detection means being indicative of the level to be applied to the control signal.

11. A sensor unit in accordance with claim 1, constituting the only environmental sensor unit associated with the air-conditioning system.

12. A sensor unit in accordance with claim 1 further comprising at least one other sensor located in the passenger compartment of the vehicle, wherein said air-conditioning system is associated with said at least one other sensor located in the passenger compartment of the vehicle.

13. A sensor unit in accordance with claim 1, wherein energy exchange means are associated with further sensor means for detecting a failure in operation of the energy exchange means.

* * * * *

UNITED STATES PATENT AND TRADEMARK OFFICE
CERTIFICATE OF CORRECTION

PATENT NO. : 5,234,049

DATED : August 10, 1993

INVENTOR(S) : Mario Palazzeti and Gianfranco Salotti

It is certified that error appears in the above-identified patent and that said Letters Patent is hereby corrected as shown below:

Column 6, line 1, delete "h" and insert --the--.

Column 7, line 25, delete "it smock-up" and insert --its mock-up".

Colum 8, line 6, delete "form" and insert --from--.

Signed and Sealed this

Nineteenth Day of April, 1994

Attest:

BRUCE LEHMAN

Attesting Officer

Commissioner of Patents and Trademarks